(12) United States Patent
Beyer et al.

(10) Patent No.: US 10,502,273 B2
(45) Date of Patent: Dec. 10, 2019

(54) PNEUMATICALLY OR ELECTROMECHANICALLY ACTUATED DISK BRAKE FOR UTILITY VEHICLES

(71) Applicant: WABCO Europe BVBA, Brussels (BE)

(72) Inventors: Frank Beyer, Mannheim (DE); Hellmut Jaeger, Ludwigshafen (DE); Eugen Kloos, Viernheim (DE)

(73) Assignee: WABCO EUROPE BVBA, Brussels (BE)

( * ) Notice: Subject to any disclaimer, the term of this patent is extended or adjusted under 35 U.S.C. 154(b) by 68 days.

(21) Appl. No.: 15/517,988

(22) PCT Filed: Nov. 21, 2015

(86) PCT No.: PCT/EP2015/002340
§ 371 (c)(1),
(2) Date: Apr. 10, 2017

(87) PCT Pub. No.: WO2016/087024
PCT Pub. Date: Jun. 9, 2016

(65) Prior Publication Data
US 2017/0307032 A1    Oct. 26, 2017

(30) Foreign Application Priority Data
Dec. 1, 2014    (DE) .................. 10 2014 017 715

(51) Int. Cl.
*F16D 55/226*    (2006.01)
*F16D 65/00*    (2006.01)
*F16D 55/00*    (2006.01)

(52) U.S. Cl.
CPC ........ *F16D 55/226* (2013.01); *F16D 65/0093* (2013.01); *F16D 2055/0008* (2013.01);
(Continued)

(58) Field of Classification Search
CPC .............. F16D 55/226; F16D 65/0093; F16D 2055/0008; F16D 2055/0079; F16D 2055/0045
See application file for complete search history.

(56) References Cited

U.S. PATENT DOCUMENTS 3,422,935 A * 1/1969 Van House ........... F16D 55/226
188/73.43
4,533,025 A * 8/1985 Carre .................. F16D 55/2265
188/72.4
(Continued)

FOREIGN PATENT DOCUMENTS

DE    29802031 U1    4/1998
DE    10063362 A1    7/2002
(Continued)

*Primary Examiner* — Vishal R Sahni
(74) *Attorney, Agent, or Firm* — Leydig, Voit & Mayer, Ltd.

(57) ABSTRACT

A pneumatically or electromechanically actuated disk brake includes a brake disk having a preferred direction of rotation in forward travel, a brake carrier extending around the brake disk, a brake caliper extending around the brake disk, a fastening-side brake pad with a friction material, an application device having a pressure-exerting device on one side of the brake disk, and a rim-side brake pad with friction material. A fastening-side line of gravity, in the rest state of the brake, is arranged with a predetermined first offset with respect to a central axis in the direction of the entry side of the brake disk in the preferred direction of rotation. A rim-side line of gravity is arranged either with a predetermined second offset with respect to the central axis, the second offset being unequal to the first offset, or with a third offset with respect to the central axis.

15 Claims, 5 Drawing Sheets

(52) U.S. Cl.
CPC .............. *F16D 2055/0045* (2013.01); *F16D 2055/0079* (2013.01)

(56) References Cited

U.S. PATENT DOCUMENTS

| | | | | |
|---|---|---|---|---|
| 4,632,227 | A | * | 12/1986 | Mery .................... F16D 55/227 188/250 B |
| 4,705,146 | A | * | 11/1987 | Tarter .................... F16D 55/226 181/208 |
| 5,022,500 | A | | 6/1991 | Wang |
| 5,386,890 | A | | 2/1995 | Itsuaki |
| 7,461,725 | B2 | * | 12/2008 | Kloos .................. F16D 65/092 188/250 B |
| 2002/0129996 | A1 | | 9/2002 | Emmet et al. |
| 2007/0256900 | A1 | * | 11/2007 | Kloos .................... F16D 55/22 188/71.3 |

FOREIGN PATENT DOCUMENTS

| | | | |
|---|---|---|---|
| DE | 10330635 | A1 | 2/2005 |
| DE | 102008005432 | A1 | 7/2009 |
| EP | 0145593 | A2 | 6/1985 |
| EP | 2392835 | A2 | 12/2011 |
| JP | H 0932870 | A | 2/1997 |

* cited by examiner

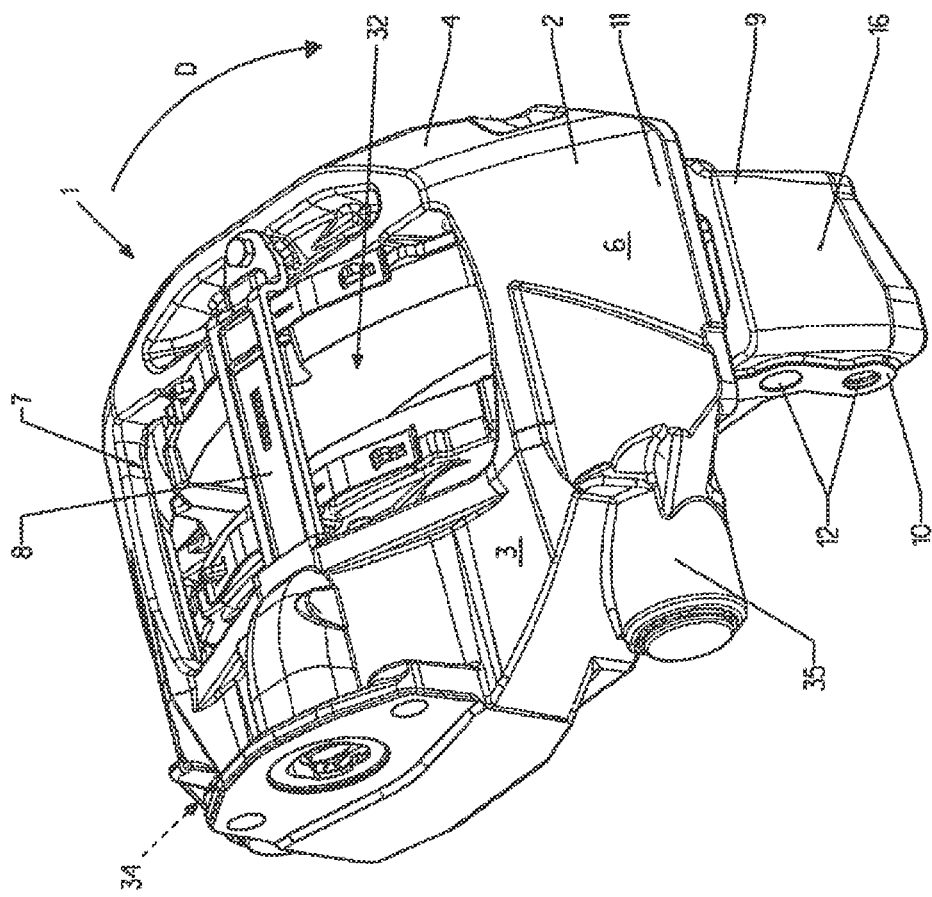

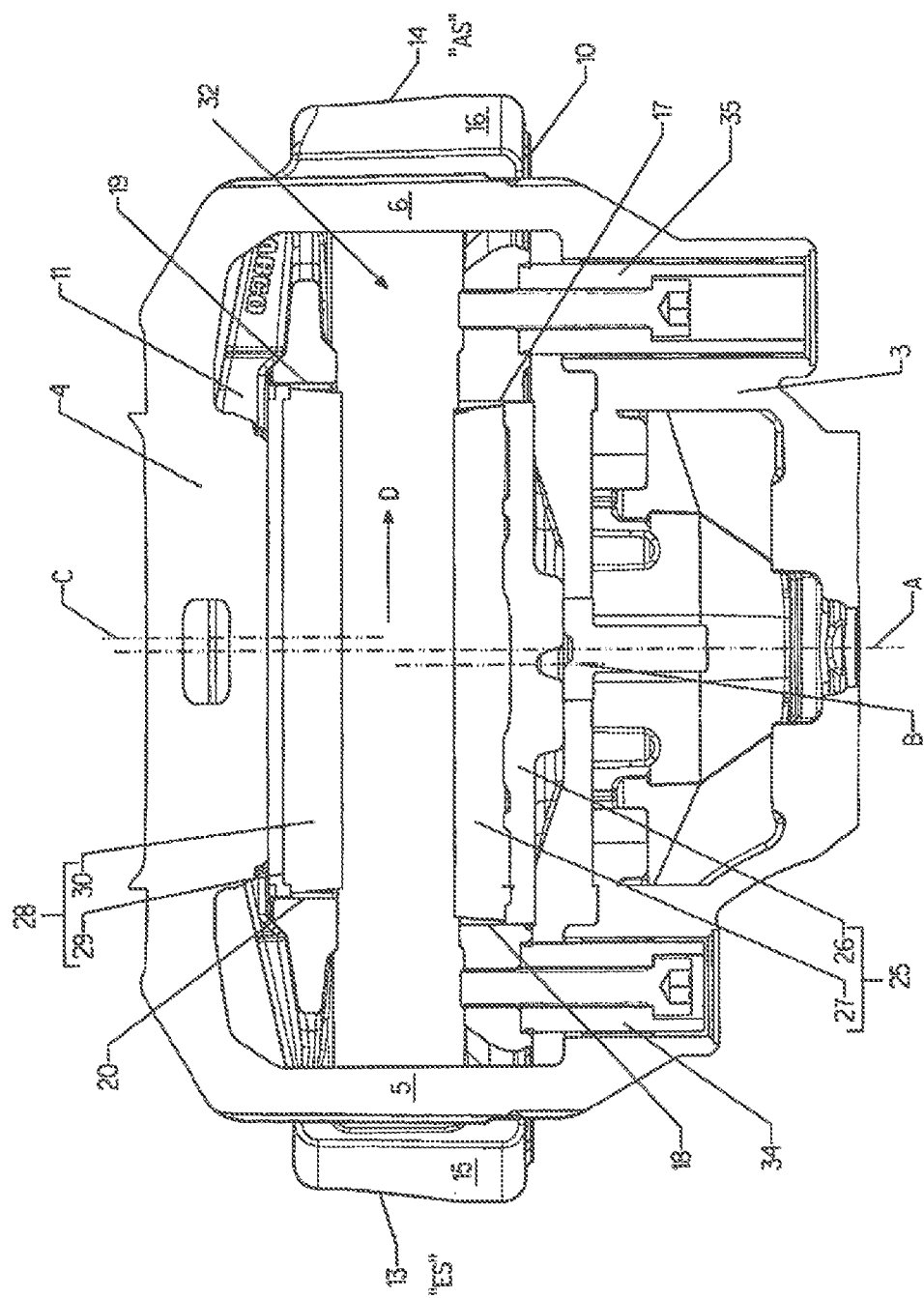

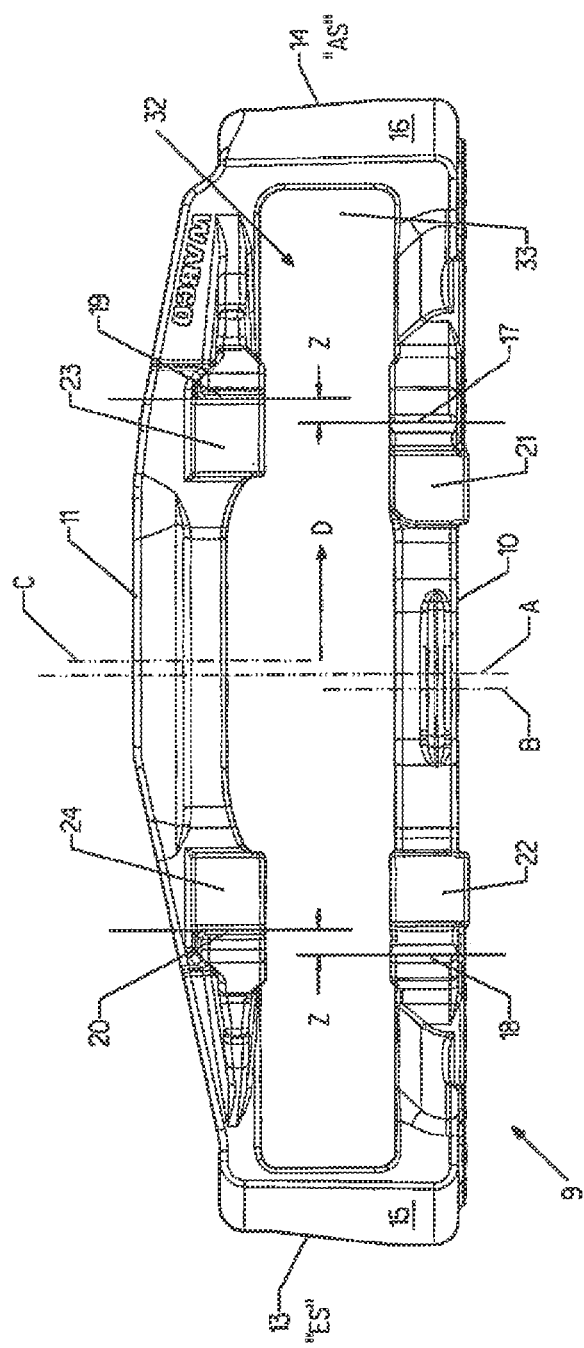

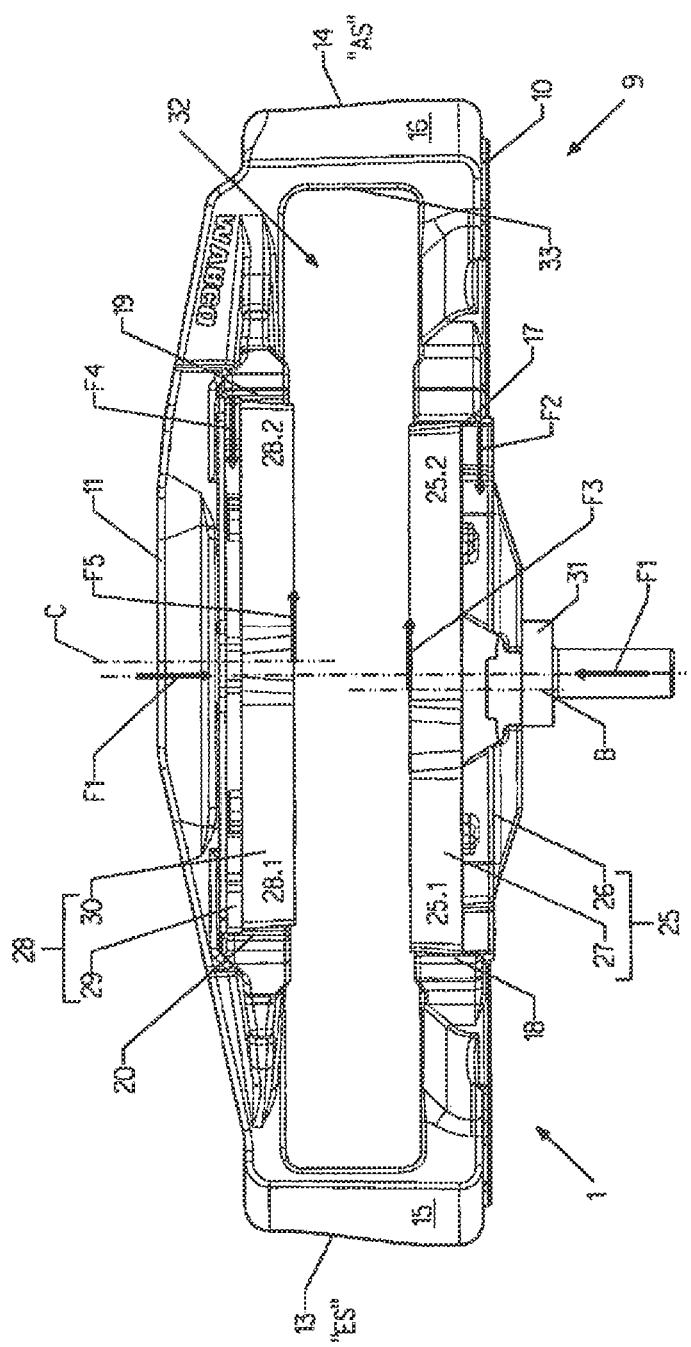

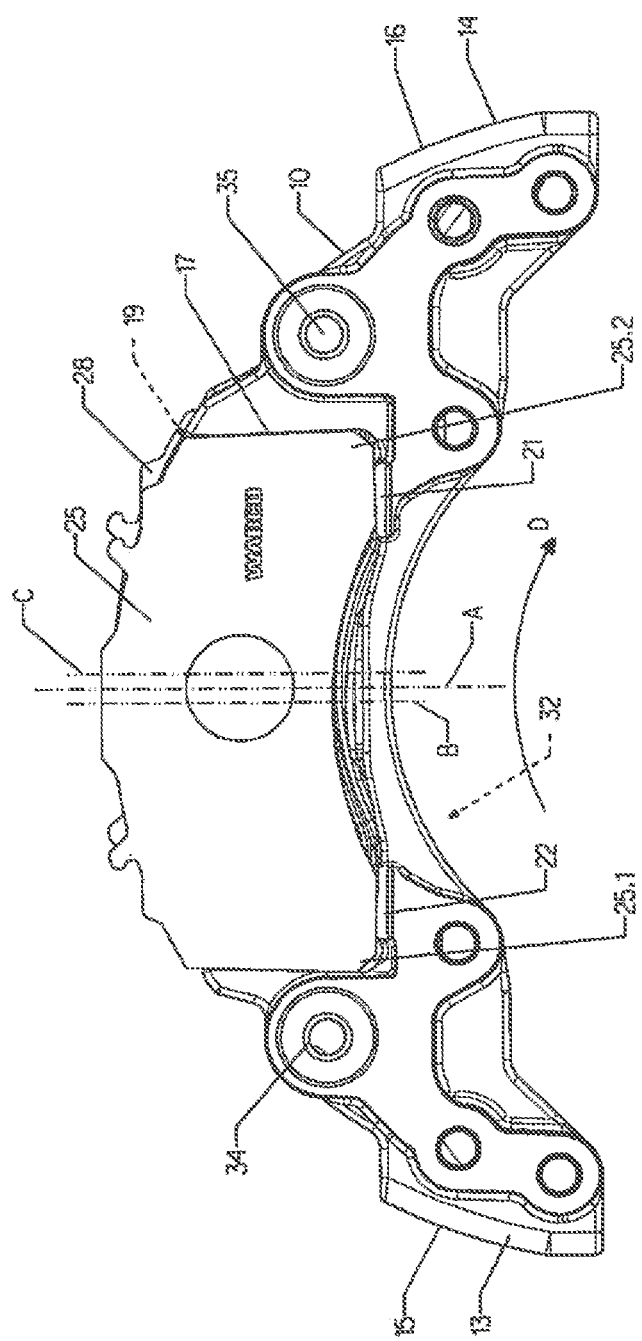

PNEUMATICALLY OR ELECTROMECHANICALLY ACTUATED DISK BRAKE FOR UTILITY VEHICLES

CROSS REFERENCE TO RELATED APPLICATIONS

This application is a U.S. National Phase application under 35 U.S.C. § 371 of International Application No. PCT/EP2015/002340), filed on Nov. 21, 2015, and claims benefit to German Patent Application No. DE 10 2014 017 715.7, filed Dec. 1, 2014. The international application was published in German on 9, Jun. 2016, as WO 2016/087024 A1 under PCT Article 21(2).

FIELD

The invention relates to a pneumatically or electromechanically actuated disk brake for utility vehicles, and more specifically, to a pneumatically or electromechanically actuated disk brake comprising a brake disk with a preferred direction of rotation in forward travel, a brake carrier extending around the brake disk, and a brake caliper extending around the brake disk.

BACKGROUND

A pneumatically or electromechanically actuated disk brake comprising a brake disk with a preferred direction of rotation in forward travel, a brake carrier extending around the brake disk, and a brake caliper extending around the brake disk which includes a first offset of the fastening-side line of gravity is intended to prevent oblique wear is known from EP 2 392 835 A2.

It has been found, however, that the measures provided in EP 2 392 835 A2 are insufficient for achieving the desired avoidance of oblique wear. This is especially the case with regard to the different installation positions of the brake in the utility vehicle. For example, viewed in the forward travel direction, the brakes may be located either in front of or behind the wheel axis, for example in the 9 o'clock position or the 3 o'clock position. Since utility-vehicle disk brakes in particular have a relatively high dead weight because of their size, being designed for tire sizes of, for example, 16 to 25 inches (406 to 635 mm), and their robust, cast construction, a skewed position may be adopted through the weight of the sliding caliper, leading, during the braking operation, to an uneven application of the lining with tangential oblique wear on the rim side.

SUMMARY

In an embodiment, the present invention provides a pneumatically or electromechanically actuated disk brake for utility vehicles. The disk brake includes a brake disk having a preferred direction of rotation in forward travel, a brake carrier extending around the brake disk, a brake caliper extending around the brake disk, a fastening-side brake pad with a friction material, wherein the fastening-side brake pad is configured to be supported, during braking, in a circumferential direction against a fastening-side region of the brake carrier on a brake disk exit side, and wherein a fastening-side line of gravity passes through a center of gravity of the friction material of the fastening-side brake pad in an axial direction of the brake, an application device having a pressure-exerting device on one side of the brake disk, wherein the application device is configured to press the fastening-side brake pad against the brake disk during braking, and wherein the pressure-exerting device has a central axis lying in the axial direction of the brake, and a rim-side brake pad with friction material, wherein the rim-side brake pad is configured to be supported, during braking, in the circumferential direction against a rim-side region of the brake carrier on the brake disk exit side, and wherein a rim-side line of gravity passes through a center of gravity of the friction material of the rim-side brake pad in the axial direction of the brake. The fastening-side line of gravity, in the rest state of the brake, is arranged with a predetermined first offset with respect to the central axis in the direction of the entry side of the brake disk in the preferred direction of rotation. The rim-side line of gravity is arranged either with a predetermined second offset with respect to the central axis in the direction of the entry side of the brake disk in the preferred direction of rotation, the second offset being unequal to the first offset, or with a third offset with respect to the central axis in the direction of the exit side of the brake disk in the preferred direction of rotation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a schematic perspective view of a disk brake according to an embodiment of the invention;

FIG. 2 is a partially cut-away top view of the disk brake of FIG. 1;

FIG. 3 is a top view of the brake carrier of the disk brake of FIGS. 1 and 2;

FIG. 4 shows the same view as FIG. 3, but with brake pads inserted and with a pressure-exerting device implemented in the form of a piston; and FIG. 5 is an axial view of individual parts from FIG. 4.

DETAILED DESCRIPTION

A disk brake described herein develops the disk brake known from EP 2 392 835 A2 in such a way that oblique wear is further reduced or even eliminated.

A pneumatically or electromechanically actuated disk brake according to one or more embodiments of the invention includes a brake disk with a preferred direction of rotation in forward travel, a brake carrier extending around the brake disk, a brake caliper extending around the brake disk, a fastening-side brake pad with a friction material. During braking, the fastening-side brake pad is supported in the circumferential direction against a fastening-side region of the brake carrier on the brake disk exit side, wherein a fastening-side line of gravity passes through the center of gravity of the friction material of said fastening-side brake pad in the axial direction of the brake. The disk brake further includes an application device having a pressure-exerting device on one side of the brake disk, the application device configured to press the fastening-side brake pad against the brake disk during braking, wherein the pressure-exerting device has a central axis lying in the axial direction of the brake. The disk brake further includes a rim-side brake pad with friction material that. During braking, the rim-side brake pad is supported in the circumferential direction against a rim-side region of the brake carrier on the brake disk exit side, wherein a rim-side line of gravity passes through the center of gravity of the friction material of said rim-side brake pad in the axial direction the brake, wherein the fastening-side line of gravity, in the rest state of the brake, is arranged with a predetermined first offset with respect to the central axis in the direction of the entry side of the brake disk in the preferred direction of rotation is described herein. Such a disk brake according to one or more embodiments of the invention has a rim-side line of gravity that is either arranged with a predetermined second offset with respect to the central axis in the direction of the entry side of the brake disk in the preferred direction of rotation, which second offset is not equal to the first offset, or is arranged with a third offset with respect to the central axis in the direction of the exit side of the brake disk in the preferred direction of rotation.

Not only the line of gravity of the actuation-side brake pad, which is also referred to as the application-side brake pad, is offset, therefore, with respect to the central axis, but also the rim-side line of gravity is offset, and not only with respect to the central axis but also with respect to the fastening-side line of gravity.

Whether the rim-side line of gravity is offset in the direction of the entry side of the brake disk in the preferred direction of rotation, or in the direction of the exit side, depends, in particular, on the installation position in which the disk brake is mounted on the vehicle. Depending on the planned installation position, therefore, the rim-side line of gravity is located in front of or behind the brake axis.

According to one or more embodiments, brakes are described herein that, in particular, have a single pressure-exerting device. Such a pressure-exerting device is generally formed by a plunger-type piston or by a pressure spindle.

U.S. Pat. No. 3,422,935 A discloses a disk brake in which both the fastening-side line of gravity and the rim-side line of gravity are offset with respect to the central axis. In this disk brake, however, the mechanical relationships are different, because the brake carrier is a so-called plate-type brake carrier which does not extend around the brake disk, so that there is no rim-side brake carrier region against which a brake pad could be supported. Instead, the rim-side brake pad is supported in the circumferential direction only against the brake caliper. Oblique wear is therefore caused, in particular, by skewed positions of the brake caliper, because the brake caliper must, in addition, directly absorb the tangential circumferential braking moments during the braking operation and transmit them to the fixed part—here the plate-type brake carrier. With a disk brake according to one or more embodiments of the invention, the rim-side brake pad is supported in the circumferential direction, on the brake disk exit side, against the fastening-side region of the brake carrier, so that skewed positions of the caliper do not result in oblique wear of the rim-side brake pad. Here, the circumferential braking moments of both brake pads during a braking operation are transmitted to the brake carrier.

Further examples of disk brakes with plate-type brake carriers—that is, with a brake carrier which does not extend around the brake disk, so that the rim-side brake pad is supported against the brake caliper in the circumferential direction—are known from U.S. Pat. Nos. 4,533,025, 5,022,500, JP 932870, U.S. Pat. No. 5,386,890, US 2007/0256900 and U.S. Pat. No. 7,461,725. In these cases, too, the brake caliper is disadvantageously loaded with tangential circumferential braking moments. Furthermore, in these cases brake pads with friction material configurations/contours different from one another are disadvantageously used.

The magnitudes of the first offset, the second offset and the third offset are in each case dependent on the overall properties of the brake, in particular its weight and installation position. According to one or more embodiments of the invention, the first offset may lie within the range from 1 mm to 8 mm, preferably 5 mm to 7.5 mm, further preferably 5 mm to 6.5 mm. The second offset may lie within the range from 1 mm to 10 mm, preferably 1 mm to 6 mm, further preferably 2 mm to 5 mm. The third offset may likewise lie within the range from 1 mm to 10 mm, preferably 1 mm to 6 mm, further preferably 2 mm to 5 mm.

According to one or more embodiments, the brake caliper is a sliding caliper. In this case the brake caliper may be axially displaceable on one, two or more guide pins with respect to the brake carrier. A reliable mounting of the brake caliper is thereby provided. Within the context of one or more embodiments, it may be provided that one guide pin has free play and another guide pin is close-fitting. The geometrical and mechanical requirements are thereby satisfied in an especially advantageous way. According to one or more embodiments of the invention it may further preferably be provided that the pin with free play is located on the disk entry side and the close-fitting pin on the disk exit side, in the preferred direction of rotation of the brake disk. However, if required by the circumstances, it may also be provided that the close-fitting pin is located on the disk entry side and the pin with free play on the disk exit side, in the preferred direction of rotation of the brake disk.

According to one or more embodiments of the invention, the offset of the two lines of gravity may in principle be produced in any desired manner. In an especially preferred embodiment of the invention, however, it is provided that a support device which is formed on the rim-side region of the brake carrier and which supports the rim-side brake pad on the disk exit side, is offset by a fourth offset with respect to a support device which is formed on an application-side region of the brake carrier and which supports the application-side brake pad on the disk exit side during braking. With a corresponding configuration of the two brake pads, especially with regard to the arrangement of the friction material on the back plate of the brake pads, the desired offsets of the lines of gravity with respect to the central axis can be adjusted. The two friction materials, or the two brake pads, are therefore not aligned towards the center of the pressure area of the piston or of the pressure spindle.

To avoid deformation induced by the loading of the fastening-side brake pad, it may be provided that the back plate of the fastening-side brake pad is thicker than that of the rim-side brake pad. This applies especially in view of the fact that, as a rule, the pressure-exerting device does not press on the entire fastening-side area of the fastening-side brake pad. However, in order to save material and costs, it may be provided according to one or more embodiments of the invention that the back plate of the fastening-side brake pad is thicker at the center than at the edge. It is therefore reinforced only where the pressure-exerting device acts. Finally, to save further material, it may preferably be provided according to one or more embodiments of the invention that the increase in thickness is effected by means of ribs and/or nubs.

Disk brakes are generally installed on both sides of a vehicle axis, so that in a preferred, forward direction of travel a left-hand and a right-hand brake are referred to. The complete disk brakes are then mirror-symmetrical to one another. In this preferred direction of travel the brake disks to be braked rotate correspondingly, the speeds in forward travel being generally higher than in reverse travel. Accordingly, the brake loadings, with corresponding lining wear, occur to a very preponderant degree with forward-travel braking operations.

In the following description, with regard to structure and position of parts, reference is made to the preferred direction of rotation D of the brake disk in forward travel. Furthermore, the partial region of the disk brake which the rotating brake disk enters in the direction of rotation D, is referred to as the brake entry side "ES". The region from which the brake disk exits is referred to as the brake disk exit side "AS" (see FIG. 2). In the installed state the disk brake extends from the fastening or application side to the region of the wheel rim. In what follows, therefore, an "application side" or "fastening side" and a "rim side" are referred to. The mounting to the axle part is effected via the fastening side of the brake carrier, which represents the fixed part.

The disk brake represented in the drawings is a left-hand sliding-caliper brake 1, which can be actuated pneumatically or electromechanically. As shown in FIGS. 1 and 2, this brake has a sliding caliper 2 and a brake carrier 9, the brake carrier 9 being fastened on its fastening side 10 to an axle part of the vehicle (not shown). For this purpose fastening holes 12 into which screws are inserted to fasten the component are provided. The brake caliper 2 has an application side 3 with an inboard-located application device (not shown), which is activated by means of a pneumatic or electromechanical actuation device, fastened to the rear side of the brake caliper 2, in such a way that it displaces a single piston 31 serving as the pressure-exerting device in the direction of the brake disk 32. The rim side 4 of the caliper is located opposite thereto in relation to the brake disk 32. The two sides 3 and 4 are connected rigidly to one another by means of an entry-side bridging strut 5 and an exit-side bridging strut 6, assuming the direction of rotation D of the brake disk 32, so that the structure as a whole forms of frame and has a radial opening 7. The size or length thereof is determined by the distance between the bridging struts 5 and 6 and corresponds to the length of the brake pads 25 and 28 located on each side of the brake disk 32. It is dimensioned in such a way that the two brake pads 25 and 28 can be inserted and removed radially in a simple manner. A retaining part 8 which can be fastened to the brake caliper 2 bridges the opening 7 in order to hold down the brake pads 25 and 28 and to secure them against loss.

The brake carrier 9 has a fastening side 10 with fastening holes 12 and a rim side 11 located opposite thereto in relation to the brake disk 32. The two sides are connected rigidly to one another, specifically by means of an entry-side strut 13 and an exit-side strut 14. Again, the whole structure is dimensioned such that the brake carrier 9 as a whole extends around the brake disk like a frame. In particular, the brake carrier 9 bridges the brake disk 23 with a section 15 on the entry side and with a section 16 on the exit side. In this way an opening 33 for receiving an area of the brake disk 32 extending thereinto is formed. In spatial terms the sections 15, 16 are located below the bridging struts 5 and 6 of the brake caliper 2.

As shown in FIGS. 1 and 2, the sliding caliper 2, in the exemplary embodiment represented in the drawing, is guided in an axially displaceable manner on two guide pins 34, 35, the two guide pins 34, 35 being fixed to the brake carrier 9 and extending into openings in the brake caliper 2. In the exemplary embodiment shown, the pin 34 has free play and is located on the disk entry side ES. The pin 35 is close-fitting and is located on the disk exit side AS. It should be noted that, as explained above, the positions of the guide pins are dependent on the particular installation conditions.

Rigidly connected and radially outward-extending abutment and guide projections are located on the fastening side 10 and on the rim side 11 of the brake carrier 9. They include, on the fastening side, the projection 17 on the disk exit side, and the projection 18 on the disk entry side. On the rim side the projection 19 is located on the disk exit side and the projection 20 on the disk entry side. The fastening-side brake pad 25, comprising a back plate 26 and friction material 27, is guided and supported between the projections 17 and 18. The rim-side brake pad 28, comprising a back plate 29 and friction material 30, is guided and supported between the projections 19 and 20. On the inward side radially, the two brake pads 25 and 28 are supported, on the fastening side 10, for the disk exit on the radial abutment 21, and for the disk entry on the radial abutment 22. On the rim side 11 this purpose is served for the disk exit by the radial abutment 23 and for the disk entry by the radial abutment 24. Thus, the brake pads 25 and 28 are supported and guided in the circumferential direction against the projections 17 to 20, while the radial abutments 21 to 24 serve for support and guidance in the radially inward direction. In the preferred direction of rotation D, therefore, the projections 17 and 19 form abutments during a braking operation. As shown, in particular, in FIG. 4, the two brake pads 25 and 28 are of equal length. The surfaces of the friction linings 27 and 30 are also of equal length. They extend from their entry sides 25.1 and 28.1 to their exit sides 25.2 and 28.2 respectively. A maximum friction strip is therefore made available on both sides of the brake disk 23. This is not the case in known passenger car disk brakes, in particular. In those brakes the main surfaces of the back plates are in each case only partially covered with friction material, the friction material being offset with respect to the respective back plates in order to counteract oblique wear. This partial covering of the back plate with friction material is uneconomic and reduces the braking force that can be generated with the brake. The present invention, by contrast, makes it possible to avoid oblique wear without wasting friction area.

When the disk brake 1 is actuated, the single piston 31 is pushed along its central axis A against the fastening-side brake pad 25, which it presses with a braking force against the brake disk 32. With increasing braking force, the sliding caliper 2 slides axially on the two guide pins 34 and 35 as a result of the reaction force and presses, with its relatively large-area rim side 4, the rim-side brake pad 28 against the brake disk 32.

As can be seen from FIGS. 2 to 5, in order to avoid tangential wear on both sides, both the fastening-side line of gravity B of the fastening-side brake pad 25, and the rim-side line of gravity C of the rim-side brake pad 28, are offset with respect to the central axis A of the single piston 31.

In relation to the preferred the direction of rotation D of the brake disk 32, the fastening-side brake pad 25 is mounted between its projections 17 and 18 and the radial abutments 21, 22 in such a way that its axis of gravity B is offset with respect to the central axis A of the single piston 31 in the direction of the brake disk entry side ES. The fastening-side axis of gravity B of the fastening-side brake pad 25 is located centrally between the pad ends, in this case entry side 25.1 and exit side 25.2.

By contrast, assuming the same direction of rotation D of the brake disk 32, the rim-side brake pad 28 is mounted between the projections 19 and 20 and the radial abutments 23 and 24 in such a way that its axis of gravity C is offset with respect to the central axis A of the single piston 31 in the direction of the brake disk exit side AS. The axis of gravity C of the rim-side brake pad 28 is located centrally between the pad ends, in this case entry side 28.1 and exit side 28.2.

In order to ensure the above offset of the fastening-side line of gravity B and the rim-side line of gravity C, the projections 17, 18, 19 and 20 are correspondingly offset. In particular, the projection 19 is offset with respect to the projection 17. In addition, the projection 20 is offset with respect to the projection 18. The respective offset is designated "Z" in FIG. 3. The lines of gravity B and C and the central axis A are all located in different positions. None of them coincides with another. The offset positions are already adopted in the rest state of the brake, and not only, for example, under dynamic loadings through lateral movements resulting from elasticities and other factors, as is the case with some known brakes.

The single piston 31 serving as the pressure-exerting device acts during braking with a force F1 (cf. FIG. 4) on the back plate 26 of the fastening-side brake pad 25 in order to press the friction material 27 against the brake disk 32. The force F1 is in this case transmitted via a relatively small pressure-application area of the single piston 31 to an area of the back plate 26 which, in comparison, is relatively large/long. With the brake disk 32 rotating against the friction material 27, this gives rise to a friction force F3 which acts in the circumferential direction on the brake pad 25, tending to rotate it. This is further augmented via the support force F2 acting against the projection 17. Since, however, the line of gravity B of the fastening-side brake pad 25 is offset with respect to the central axis A of the single piston 31 in the direction of the brake disk entry side ES, the clockwise rotation of the brake pad 25 is counteracted by the change in lever ratios, counteracting tangential wear on the brake disk entry side ES.

On the rim-side brake pad 28 the braking force F1 generates through reaction an opposing force F1'. This gives rise to a friction force F5 on the friction material 30 of the rim-side brake pad 28, which generates an abutment force F4 against the projection 19. Because the forces F5 and F4 are offset with the line of gravity C, an anticlockwise rotation is induced. As a result of the offset of the line of gravity C with respect to the central axis A, a directed additional moment is generated on the rim-side brake pad 28, compensating influences of the weight of the brake caliper 2. This is especially the case when the brake caliper is mounted in front of or behind the brake axis, for example in the 3 o'clock position or the 9 o'clock position.

Depending on the size of the brake and of the brake pad, the offset of the line of gravity B with respect to the central axis A may lie within the range from 1 mm to 8 mm, preferably 5 mm to 7.5 mm, further preferably 5 mm to 6.5 mm. The offset of the line of gravity C with respect to the central axis A may lie within the range from 1 mm to 10 mm, preferably 1 mm to 6 mm, further preferably 1 mm to 5 mm. With full covering of the areas of the back plates 26 and 29 with friction material 27 and 30 respectively, as aimed at according to one or more embodiments of the invention, these offset distances are obtained by suitable specification of the offset Z.

Tangential oblique wear caused by the installation position of the disk brake is compensated, in particular, by the suitably selected offset of the rim-side lines of gravity B with respect to the central axis A.

In the exemplary embodiment represented in the drawing with the positions of the guide pins 34 and 35 shown there, the rim-side brake pad 28 is offset in the direction of the disk exit side AS. In the case of different installation conditions and different positions, especially of the guide pins 34 and 35, the rim-side brake pad 28 may also be offset in the direction of the brake disk entry side ES with respect to the central axis of the single piston 31. However, the line of gravity B is always offset towards the disk entry side ES with respect to the central axis A.

FIG. 5 shows the above-explained positions of parts, viewed in the direction of the fastening side 10 of the brake carrier 9. Here, the mutually offset lines of gravity B and C of the schematically represented brake pads 25 and 28, including the offset with respect to the central axis A, can be seen. The mutually overlapping outer contours of the brake pads 25 and 28 can also be seen.

In the case of heavy brakes of utility vehicles, for example for wheels of 22 inches (585.8 mm) and above, the back plate 26 of the fastening-side brake pad 25 may be constructed thicker than the back plate 29 of the rim-side brake pad 28, in order to avoid deformation during the braking operation resulting from the relatively small contact face of the single piston 31. In the embodiment of the invention represented in the drawing, the back plate 26 has a structuring, starting from its basic thickness and proceeding to the single piston 31, which structuring, beginning approximately from the two ends 25.1 and 25.2, tapers in the direction of the single piston 31. This trapezoidal structuring, which is apparent especially in FIGS. 2 and 4, may be formed by ribs and/or nubs. It may also be a full structuring. The advantage of this structuring is a saving in weight and material as compared to a solution with an unvarying back plate thickness, with which, however, deformation can also be avoided. In the exemplary embodiment represented in the drawing the back plate may be produced from cast material in a casting process, or may be a forging. By contrast, normal back plates may be produced as sheet metal parts which are stamped or formed without cutting.

The sizes and size relationships shown in the drawings should be understood schematically and serve only for clarification. In practice they depend on the size and installation conditions of the brake.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

D Preferred direction of rotation of disk in forward travel
ES Disk entry side (entry-side)
AS Disk exit side (exit-side)
A Central axis
B Rim-side line of gravity
C Fastening-side line of gravity
Z Offset between the abutment/guide projections
1 Sliding caliper disk brake
2 Sliding caliper
3 Application side of sliding caliper
4 Rim side of sliding caliper
5 Entry-side bridge strut, sliding caliper
6 Exit-side bridge strut, sliding caliper
7 Installation/removal opening for brake pads
8 Retaining part for brake pads
9 Brake carrier/fixed part
10 Fastening-side (inner-side), brake carrier
11 Rim-side (outer-side), brake carrier
12 Fastening holes, fastening-side of brake carrier
13 Entry-side strut, brake carrier
14 Exit-side strut, brake carrier
15 Entry-side section, brake carrier
16 Exit-side section, brake carrier
17 Abutment/guide projection on exit side, application side
18 Abutment/guide projection on entry side, application side
19 Abutment/guide projection on exit side, rim side
20 Abutment/guide projection on entry side, rim side
21 Radial abutment guide projection on exit side, application side
22 Radial abutment on entry side, application side
23 Radial abutment on exit side, rim side
24 Radial abutment on entry side, rim side
25 Brake pad, application side
25.1 Brake pad entry side, application side
25.2 Brake pad exit side, application side
26 Brake pad back plate, application side
27 Friction material, application side
28 Brake pad, rim side
28.1 Brake pad entry side, rim side
28.2 Brake pad exit side, rim side
29 Brake pad back plate, rim side
30 Friction material, rim side
31 Single piston
32 Brake disk
33 Opening for brake disk in brake carrier
34 Guide pin, entry side
35 Guide pin, exit side

What is claimed is:

1. A pneumatically or electromechanically actuated disc brake for utility vehicles, comprising:
a brake disc having a preferred direction of rotation in forward travel;
a brake carrier extending around the brake disc;
a brake caliper extending around the brake disc;
a fastening-side brake pad comprising a fastening-side back plate and a fastening-side friction material, wherein the fastening-side brake pad is configured to be supported, during braking, in a circumferential direction against a fastening-side region of the brake carrier on a brake disc exit side, and wherein a fastening-side line of gravity passes through a center of gravity of the friction material of the fastening-side brake pad in an axial direction of the brake;
a rim-side brake pad comprising a rim-side back plate and a rim-side friction material, wherein the rim-side brake pad is configured to be supported, during braking, in the circumferential direction against a rim-side region of the brake carrier on the brake disc exit side, and wherein a rim-side line of gravity passes through a center of gravity of the friction material of the rim-side brake pad in the axial direction of the brake;
a first support device formed on the rim-side region of the brake carrier and configured to support the rim-side brake pad on the brake disc exit side;
a second support device formed on an fastening-side region of the brake carrier and configured to support the fastening-side brake pad on the disc exit side during braking; and
an application device having a pressure-exerting device on one side of the brake disc, wherein the application device is configured to press the fastening-side brake pad against the brake disc during braking, and wherein the pressure-exerting device has a central axis lying in the axial direction of the brake,
wherein the fastening-side line of gravity, in the rest state of the brake, is arranged with a predetermined first transverse offset with respect to the central axis, the transverse direction being defined to extend perpendicular to the axial direction and parallel to the preferred direction of rotation,
wherein the rim-side line of gravity is arranged either with a predetermined second transverse offset with respect to the central axis, the second offset being unequal to the first offset, or with a third transverse offset with respect to the central axis,
wherein the fastening-side back plate is transversely offset with respect to the rim-side back plate, and
wherein the first support device is offset by a fourth offset with respect to the second support device.

2. The disc brake of claim 1, wherein the fastening-side friction material fully covers a brake-disc facing side of the fastening-side back plate.

3. The disc brake of claim 2, wherein the rim-side friction material fully covers a brake-disc facing side of the rim-side back plate.

4. The disc brake of claim 1, wherein the fastening-side friction material is not transversely offset with respect to the fastening side back plate.

5. The disc brake of claim 1, wherein the fastening-side line of gravity passes through a center of gravity of the fastening-side back plate in the axial direction of the brake.

6. The disc brake of claim 5, wherein the brake caliper is a sliding caliper and the brake caliper is axially displaceable on one or more guide pins with respect to the brake carrier.

7. The disc brake of claim 6, wherein the brake caliper is axially displaceable on two guide pins, wherein a first guide pin has free play and a second guide pin is close-fitting.

8. The disc brake of claim 7, wherein the first guide pin with free play is located on the disc entry side and the second close-fitting guide pin is located on the disc exit side, in the preferred direction of rotation of the brake disc.

9. The disc brake of claim 7, wherein the first guide pin with free play is located on the disc exit side and the second close-fitting guide pin is located on the disc entry side, in the preferred direction of rotation of the brake disc.

10. The disc brake of claim 1, wherein the fastening-side back plate is thicker than the rim-side back plate.

11. The disc brake of claim 1, wherein the fastening-side back plate has a thickness that is increased at a center relative to an edge.

12. The disc brake of claim 11, wherein the increased thickness is effected by ribs and/or nubs.

13. A pneumatically or electromechanically actuated disc brake for utility vehicles, comprising:
- a brake disc configured to rotate about an axis of rotation in a preferred direction of rotation;
- a brake carrier, including:
  - a rim-side region disposed, in an axial direction parallel to the axis of rotation, on an outer side of the brake disc, and
  - a fastening-side region disposed, in the axial direction, on an inner side of the brake disc;
- a brake caliper;
- a fastening-side brake pad including a fastening-side back plate and a fastening-side friction material, wherein the fastening-side brake pad is supported on the fastening-side region of the brake carrier, and wherein a fastening-side line of gravity passes through a center of gravity of the friction material of the fastening-side brake pad in the axial direction;
- a rim-side brake pad including a rim-side back plate and a rim-side friction material, wherein the rim-side brake pad is supported on the rim-side region of the brake carrier, and wherein a rim-side line of gravity passes through a center of gravity of the friction material of the rim-side brake pad in the axial direction; and
- an application device disposed on the inner side of the brake disc, wherein the application device includes a pressure-exerting device configured to press the fastening-side brake pad against the brake disc during braking, and wherein the pressure-exerting device has a central axis parallel to the axial direction,
- wherein a first support device is formed on the rim-side region of the brake carrier and configured to support the rim-side brake pad on the brake disc exit side,
- wherein a second support device is formed on an fastening-side region of the brake carrier and configured to support the fastening-side brake pad on the disc exit side during braking,
- wherein the fastening-side line of gravity, in the rest state of the brake, is arranged with a predetermined first transverse offset with respect to the central axis, the transverse direction being defined as extending perpendicular to the axial direction and parallel to the preferred direction of rotation,
- wherein the fastening-side back plate is transversely offset with respect to the rim-side back plate,
- wherein the rim-side line of gravity is arranged with:
  - a predetermined second transverse offset with respect to the central axis in the direction of the entry side of the brake disc, the second offset being unequal to the first offset, or
  - a predetermined third transverse offset with respect to the central axis, and
- wherein the first support device is offset by a fourth offset with respect to the second support device.

14. The disc brake of claim 13, wherein the central axis of the pressure-exerting device is transversely offset with respect to an axially extending center of gravity of the fastening-side brake plate.

15. The disc brake of claim 13, wherein the rim-side region of the brake carrier includes a first abutment disposed towards the exit side of the rim-side brake pad and configured to provide, during braking, a supporting force in a direction opposite to the preferred direction of rotation, and
- wherein the fastening-side region of the brake carrier includes a second abutment disposed towards the exit side of the fastening-side brake pad and configured to provide, during braking, a supporting force in a direction opposite to the preferred direction of rotation.

* * * * *